United States Patent [19]

Iwama et al.

[11] Patent Number: 4,550,135

[45] Date of Patent: Oct. 29, 1985

[54] TIRE RUBBER COMPOSITION

[75] Inventors: Satoshi Iwama, Osaka; Mitsuaki Hashiyama, Shiga, both of Japan

[73] Assignee: Toyo Tire & Rubber Co., Ltd., Osaka, Japan

[21] Appl. No.: 632,860

[22] Filed: Jul. 20, 1984

[30] Foreign Application Priority Data

Jul. 22, 1983 [JP] Japan ................... 58-134657

[51] Int. Cl.$^4$ ............ C08K 3/04; C08L 9/06; C08L 51/01
[52] U.S. Cl. .................... 524/495; 524/496; 524/505
[58] Field of Search ............... 524/495, 496, 505

[56] References Cited

U.S. PATENT DOCUMENTS

| | | | |
|---|---|---|---|
| 3,725,103 | 4/1973 | Jordan et al. | 524/495 |
| 4,035,336 | 7/1977 | Jordan et al. | 524/495 |
| 4,071,496 | 1/1978 | Kraus et al. | 524/495 |
| 4,309,318 | 1/1982 | Ahagon et al. | 524/495 |

FOREIGN PATENT DOCUMENTS 57-94030  6/1982  Japan ................... 524/495

Primary Examiner—Allan M. Lieberman
Attorney, Agent, or Firm—Oblon, Fisher, Spivak, McClelland & Maier

[57] ABSTRACT

A rubber tire composition, comprising:
from 20 to 150 parts by weight of carbon black incorporated in 100 parts by weight of rubber;
at least 30 parts by weight of said rubber being a star type solution polymerized random styrene-butadiene copolymer rubber comprising 10% to 20% by weight of styrene units and the balance of butadiene units; said styrene units having at least 40% by weight of the single isolated styrene units which are separated from each other and 5% by weight or less of the styrene units in the form of long chain blocks each consisting of 8 or more styrene units bound to each other, based on the entire weight of said styrene units in the copolymer; said butadiene units having 35% to 50% by mole of butadiene units in the form of 1,2-vinyl structure based on the entire mole of said butadiene units in the copolymer; said styrene-butadiene copolymer rubber having the ratio ($\overline{Mw}/\overline{Mn}$) of 1.2 to 3.5, wherein $\overline{Mw}$ and $\overline{Mn}$ represent the weight average and number average molecular weights, respectively; and said styrene-butadiene copolymer rubber having a coupling efficiency of 40% or more; and
said carbon black being a furnace carbon black having (1) a specific surface area ($N_2SA$) in the range of 75 to 105 as measured by nitrogen adsorption technique, (2) the difference between said $N_2SA$ value and the measured iodine adsorption value (IA) being at least 15 (i.e., $N_2SA - IA \geq 15$) and (3) the difference between said $N_2SA$ value and the measured specific surface area (CTAB) as determined by the cetyltrimethylammonium bromide adsorption technique being not greater than 5 (i.e., $N_2SA - CTAB \leq 5$); said furnace carbon black also having a dibutyl phthalate adsorption value (24M4 DBP) of not greater than 110 (ml/100 g) and a tinting strength (Tint) of 90 to 110, provided that the difference ($\Delta$Tint) between the measured Tint and the calculated Tint of the furnace carbon black is not greater than $-3$ [i.e., (measured Tint) − (calculated Tint) $\leq -3$].

4 Claims, 1 Drawing Figure

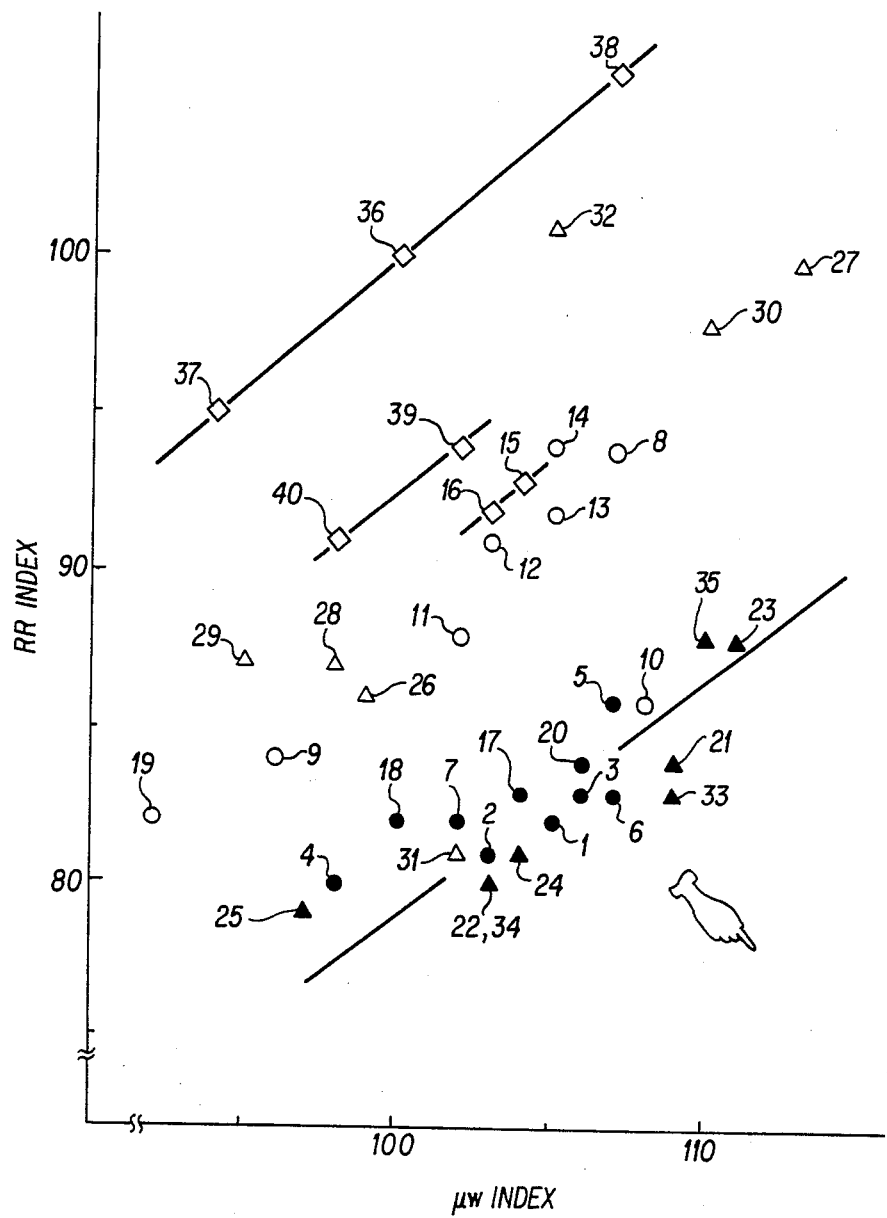

TIRE RUBBER COMPOSITION

BACKGROUND OF THE INVENTION

1. Field of the Invention

The present invention relates to a tire rubber composition, more specifically, to a tire tread rubber composition capable of providing a tire tread having a good balance between the rolling resistance and the coefficient of sliding friction on wet road surfaces.

2. Description of the Prior Art

With the current worldwide concern for saving resources and energy, car manufacturers are making intensive efforts to achieve better mileage economy. To meet this end, it is essential that tire manufacturers find effective ways to minimize energy loss resulting from the motion of tires.

Two principal functions of tires are to support the weight of the automobile and to transmit the driving force of the wheels. As is well known, the energy loss resulting from the friction between a tire and the road surface or from the heat generated by the tire itself, has an appreciable effect on the fuel consumption of a car. However, the energy loss attributable to the tire itself, i.e., its rolling resistance, cannot be reduced without also decreasing the coefficient ($\mu w$) of its sliding friction against a wet road surface. In other words, a tire with a small rolling resistance has a great tendency to cause skidding. It is therefore very important for tire manufacturers to obtain a good balance between the rolling resistance of the tire and its coefficient of sliding friction on a wet road surface. A need therefore continues to exist for a tire which exhibits a good balance between its rolling resistance and the property of the tire to skid on wet road surfaces all the while exhibiting minimum energy loss.

SUMMARY OF THE INVENTION

Accordingly, one object of the present invention is to provide a rubber tire composition which results in a tire which exhibits improved minimized energy loss characteristics and an improved balance between its rolling resistance and coefficient of sliding friction.

Briefly, this object and other objects of the present invention as hereinafter will become more readily apparent can be attained by a rubber tire composition formulated with from 20 to 150 parts by weight of carbon black incorporated in 100 parts by weight of rubber, wherein at least 30 parts by weight of said rubber being a star type solution polymerized random styrene-butadiene copolymer rubber comprising 10% to 20% by weight of styrene units and the balance of butadiene units; said styrene units having at least 40% by weight of the single isolated styrene units which are separated from each other and 5% by weight or less of the styrene units in the form of long chain blocks each consisting of 8 or more styrene units bound to each other, based on the entire weight of said styrene units in the copolymer; said butadiene units having 35% to 50% by mole of butadiene units in the form of 1,2-vinyl structure based on the entire mole of said butadiene units in the copolymer; said styrene-butadiene copolymer rubber having the ratio ($\overline{Mw}/\overline{Mn}$) of 1.2 to 3.5, wherein $\overline{Mw}$ and $\overline{Mn}$ represent the weight average and number average molecular weights, respectively; and said styrene-butadiene copolymer rubber having a coupling efficiency of 40% or more; and said carbon black being a furnace carbon black having (1) a specific surface area ($N_2SA$) in the range of 75 to 105 as measured by nitrogen adsorption technique, (2) the difference between said $N_2SA$ value and the measured iodine adsorption value (IA) being at least 15 (i.e., $N_2SA - IA \geq 15$) and (3) the difference between said $N_2SA$ value and the measured specific surface area (CTAB) as determined by the cetyltrimethylammonium bromide adsorption technique being not greater than 5 (i.e., $N_2SA - CTAB \leq 5$); said furnace carbon black also having a dibutyl phthalate adsorption value (24M4 DBP) of not greater than 110 (ml/100 g) and a tinting strength (Tint) of 90 to 110, provided that the difference ($\Delta$ Tint) between the measured Tint and the calculated Tint of the furnace carbon black is not greater than $-3$ [i.e., (measured Tint) $-$ (calculated Tint) $\leq -3$].

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein:

the FIGURE shows the relationship between the RR index of a tire indicating its rolling resistance and the coefficient of sliding resistance ($\mu w$ index) of the tire on a wet road surface.

DETAILED DESCRIPTION OF THE INVENTION

In order to obtain a good balance between the rolling resistance of a tire and its coefficient of sliding friction ($\mu w$) of the tire on a wet road surface, studies have now been made on the polymer used as the principal component of a tire rubber composition, and the necessary additives which are blended with the polymer. Particular attention has been devoted to the carbon black additive which is important as a reinforcing agent. As a result, it has now been found that the requirements for a tire of improved properties can be achieved by using a furnace black additive having the following characteristics: (1) a specific surface area ($N_2SA$) in the range of 75 to 105 as measured by nitrogen adsorption technique, (2) the difference between said $N_2SA$ value and the measured iodine adsorption value (IA) being at least 15 (i.e., $N_2SA - IA \geq 15$), (3) the difference between said $N_2SA$ value and the measured specific surface area (CTAB) as determined by the cetyltrimethylammonium bromide adsorption technique being not greater than 5 (i.e., $N_2SA - CTAB \leq 5$), (4) a dibutyl phthalate adsorption value (24M4 DBP) of not greater than 110 (ml/100 g), and (5) a tinting strength (Tint) of 90 to 110, provided that the difference ($\Delta$ Tint) between the measured Tint and the calculated Tint of the furnace carbon black is not greater than $-3$ [i.e., (measured Tint) $-$ (calculated Tint) $\leq -3$]. By incorporating a furnace carbon black having these characteristics into rubber, a rubber composition having a good balance between the rolling resistance (RR) and the coefficient ($\mu w$) of sliding friction on a wet road surface can be obtained.

The value of $\Delta$Tint is obtained by subtracting the calculated Tint from the measured Tint. The calculated Tint is determined from the following equation:

$$\text{Calculated Tint} = 56 + 1.057 \times (CTAB) - 0.002745 \times (CTAB)^2 - 0.2596 \times (24M4\ DBP) - 0.201 \times (N_2SA - CTAB) \quad \text{equation 1}$$

(see *Rubber Chemistry and Technology,* Vol. 48, page 538, 1975).

The use of the above characterized carbon black in a tire tread rubber composition has been proposed in copending application Ser. No. 632,830 filed July 20, 1984 which is herein incorporated by reference.

Compared with a tread rubber composition which uses the conventional carbon black, the rubber composition shown above and described in said copending application exhibits a good balance between its rolling resistance (RR) and its coefficient ($\mu w$) of sliding friction on a wet road surface. However, this rubber composition has been found to be unable to provide an even better balance between RR and $\mu w$ values. This deficiency has led to the discovery of the present invention as it pertains to the polymer component of the tire which is the principal component of a tire rubber composition. The basis of the invention is the combination of the above-described carbon black material having the indicated colloidal characteristics shown above with a styrene-butadiene copolymer having the microstructure to be described later in this specification. Unexpectedly, it has been found that the resulting rubber composition has a much better balance between the rolling resistance (RR) and coefficient ($\mu w$) of sliding friction on a wet road surface properties than the balance of properties exhibited by carbon black rubber tire formulations in which either one of the ingredients of the rubber is a conventional tire ingredient or formulation in which neither the carbon black nor the copolymer components of the present invention are present.

The polymer used in the present invention is a styrene-butadiene random copolymer rubber (SBR) as described, for example, in Japanese Patent Application (OPI) Nos. 100112/1982 and 179212/1982 (OPI as used herein means an unexamined published Japanese patent application) which is obtained by polymerization in an organic solvent in the presence of an organic lithium catalyst. This polymer has a component characterized by the following features; (i) random styrene-butadiene copolymer rubber comprising 10% to 20% by weight of styrene units and the balance of butadiene units, (ii) said styrene units having at least 40% by weight of the single isolated styrene units which are separated from each other and 5% by weight or less of the styrene units in the form of long chain blocks each consisting of 8 or more styrene units bound to each other, based on the entire weight of said styrene units in the copolymer, which contents have been determined by decomposing said copolymer with ozone and by subjecting said ozone-decomposition product to a gel permeation chromatographic analysis, (iii) said butadiene units having 35% to 50% by mole of butadiene units in the form of 1,2-vinyl structure based on the entire mole of said butadiene units in the copolymer, (iv) said styrene-butadiene copolymer rubber having the ratio ($\overline{M}w/\overline{M}n$) of 1.2 to 3.5, wherein $\overline{M}w$ and $\overline{M}n$ represent the weight average and number average molecular weights, respectively, and (v) said styrene-butadiene copolymer rubber having a coupling efficiency of 40% or more. This copolymer will hereinafter be referred to as the polymer component.

The random styrene/butadiene copolymer of the invention can be produced by either a batch or continuous polymerization technique. In the event of a continuous polymerization, a reactor such as a tube type reactor is used which contains at least two polymerization zones connected in series and maintained at different temperatures. Preferably, polymerization mixture is fed separately to the two zones, in which case it is preferred that the mixture of styrene and butadiene in an inert solvent be fed into the reactor in which the proportion of styrene to butadiene supplied is the same. The continuous polymerization process should be conducted at a temperature which is at least 80° C., preferably at least 90° C., most preferably from 90° C. to 180° C. If the temperature of the continuous process is below 80° C., the content of the styrene units in the copolymer in the form of undesirable long chain blocks becomes too great which means the resultant polymer is not a satisfactory random copolymer. Also, at too low a temperature the yield or productivity of the random copolymer diminishes.

In the event a batch polymerization procedure is employed, it is essential that the copolymerization process be initiated at a temperature of from 30° C. to 80° C. with the maximum temperature during the process not exceeding 120° C. The difference between the maximum temperature during polymerization and the initiation temperature should be maintained within the range of 10° C. to 45° C. Temperature can be controlled by several techniques such as by varying the amount of diluent relative to monomers to be polymerized or by removing heat by means of a jacket about the reactor or a cooling coil within the reactor. Similarly, in the case of the continuous polymerization process the difference between the maximum and minimum temperature within the polymerization zone should be maintained within the range of from 10° C. to 45° C.

The random styrene-butadiene copolymerization reaction is conducted in the presence of a catalyst of an organolithium compound and a Lewis base. Suitable organolithium compounds include methyl lithium, ethyl lithium, n-, sec- and tert-butyl lithium, amyl lithium, phenyl lithium, cyclohexyl lithium and the like. Suitable Lewis bases include at least one compound selected from the group of thioether compounds, tertamine compounds, phosphine compounds, alcoholates of alkali metals, sulfonic acid salts of alkali metals other than lithium, sulfuric acid esters, and the like. Specific Lewis base compounds include dimethylether, diethyl ether diphenyl ether, tetrahydrofuran, dioxane, 1,2-dimethoxyethane, 1,2-dibutoxyethane, triethylamine, N,N,N',N'-tetramethylethylenediamine, dialkylarylsulfide, hexamethylenephosphoamide, potassium and sodium alkylbenzensulfonate and potassium and sodium butoxide. Preferred Lewis bases are ethylene glycol dialkylethers and tertamines.

The amount of the Lewis base which is used can vary depending on the polymerization temperature and the intensity which the polymerization medium is agitated. In the event an ethylene glycol dialkyl ether or a tert-diamine is used as the Lewis base, the amount used should range from 0.3 to 20 parts by weight, preferably from 0.5 to 5.0 parts by weight, per one part by weight or the organo lithium compound.

Any inert diluent may be used in the process as long as it does not deactivate the catalyst. Suitable examples include butane, pentane, hexane, heptane, cyclohexane, ethylcyclohexane, and the like. Preferred diluents are hexane and cyclohexane. The diluted solution of styrene and butadiene may contain an allenic comonomer such as propadiene, 1,2-butadiene, 1,2-pentadiene and 1,2-octadiene in an amount of one mole or less per mole of the organolithium compound.

In the event a continuous polymerization process is employed, it is important that the mixture in the polymerization regions by vigorously agitated, especially at the inlet to the reactor. With respect to theoretical considerations it is preferred that at the inlet to the reactor, the value of the quotient of the linear speed (m/sec) of the agitator and the viscosity (poise) of the polymerization mixture in the polymerization region should be $1 \times 10^{-2}$ or more, preferably $5 \times 10^{-2}$ or more. If the quotient is smaller than $1 \times 10^{-2}$, the resultant copolymer rubber will contain an excessive amount of undesirable long chain blocks of styrene units.

The rubber described above may be used either alone or in a rubber blend consisting of at least 30 parts by weight of said rubber and not more than 70 parts by weight of at least one other diene rubber.

If the amount of the styrene content in the polymer component exceeds 20 wt%, the resulting composition has a low wear resistance and does not exhibit balanced rolling resistance (RR) and coefficient ($\mu$w) of sliding friction properties. If the styrene content is less than 10 wt% of the polymer component, the effect of limiting the distribution of styrene chains within the stated range is not achieved to the fullest extent. Of the distribution of the molecular weight of the polymer component ($\overline{Mw}/\overline{Mn}$) is narrower than 1.2, the resulting rubber composition does not have sufficient processability, and if the $\overline{Mw}/\overline{Mn}$ is broader than 3.5, the desired low rolling resistance is not achieved.

According to the present invention, the distribution of styrene chains must be such that the content of the single isolated styrene units which are separated from each other is at least 40 wt% based on the entire weight of the styrene units in the copolymer, and that the content of the styrene units in the form of long chain blocks each consisting of 8 or more styrene units bound to each other is 5 wt% or less based on the entire weight of the styrene units in the copolymer. If these requirements are not met, the desired low rolling resistance and the desired high wear resistance are not obtained, even though the styrene content in the polymer is in the range of 10 to 20 wt%.

Preferably, the polymer component prepared by using tin tetrachloride as a coupling agent during polymerization of the monomers and having two peaks in its molecular weight distribution pattern is preferred for the present invention, since it can provide the desired low rolling resistance.

The present invention is thus characterized by combining the above-described polymer with a specific carbon black.

A rubber composition having a certain balance between rolling resistance and the coefficient ($\mu$w) of sliding friction on a wet road surface may be obtained by formulating the above characterized polymer component with a conventional type of carbon black reinforcing agent, or by formulating the specific carbon black component of the present invention in a conventional type of polymer. However, by combining the present polymer component and the carbon black material described above, a tire rubber composition having a significantly improved balance between rolling resistance and the coefficient ($\mu$w) of sliding friction on a wet road surface can be obtained which leads to a tire tread of superior performance capabilities, which capabilities are not achieved by conventional formulations or formulations which only employ one of the two ingredients of the present composition.

The carbon black component used in the present invention has been selected from the point of view of obtaining a rubber composition having small values of loss tangent (tan $\delta$) and storage elastic modulus (E'). It is generally known that the rolling resistance (RR) of a tire is a function of $E''/E' = \tan \delta$, wherein E" is the loss elastic modulus and E' is the storage elastic modulus. Tires having a low loss tangent (tan $\delta$) also have a low rolling resistance (RR). The coefficient ($\mu$w) of sliding friction on a wet road surface is also closely related to the viscoelasticity property of rubber and, the higher the tan $\delta$, the higher the $\mu$w. However, a rubber composition having a high tan $\delta$ has an undesirably high rolling resistance (RR).

Various studies leading to the present invention were conducted in an attempt to reconcile these two incompatible requirements. The conclusion was reached that in order to increase the ($\mu$w) value without increasing the RR value, it is necessary to reduce the value of E' to the extent that the level of tan $\delta$ is not greatly affected. This idea was also adopted in accomplishing the invention described and claimed in the copending U.S. patent application having Ser. No. 632,830 filed 7-20-84. The adjustment of these parameters in the manner indicated provides a good balance between the values of RR and $\mu$w.

In order to meet the above requirements, the carbon black component of the present formulation must have (1) a specific surface area ($N_2SA$) in the range of 75 to 105 as measured by nitrogen adsorption technique, (2) the difference between said $N_2SA$ value and the measured iodine adsorption value (IA) being at least 15 (i.e., $N_2SA - IA \geq 15$), (3) the difference between said $N_2SA$ value and the measured specific surface area (CTAB) as determined by the cetyltrimethylammonium bromide adsorption technique being not greater than 5 (i.e., $N_2SA - CTAB \leq 5$), (4) a dibutyl phthalate adsorption value (24M4 DBP) of not greater than 110 (ml/100 g), and (5) a tinting strength (Tint) of 90 to 110, provided that the difference ($\Delta$ Tint) between the measured Tint and the calculated Tint of the furnace carbon black is not greater than $-3$ [i.e., (measured Tint)$-$(calculated Tint)$\leq -3$]. If the $N_2SA$ of the carbon component is less than 75, the resulting rubber composition has such a low wear resistance that it is not suitable for use as a tire tread. If the $N_2SA$ value exceeds 105 (m$^2$/g), the resulting composition has an increased tan $\delta$ which leads to an increased rolling resistance.

If the Tint value is less than 90, the resulting rubber composition exhibits a poor wear resistance. If the Tint value is more than 110, a rubber composition having an excessively great tan $\delta$ results. If the value of 24M4 DBP exceeds 110 (ml/100 g), the value of E' becomes excessive.

The difference between $N_2SA$ and IA must be at least 15 ($N_2SA - IA \geq 15$). The greater the difference, the higher the surface activity of the carbon black. If the difference between $N_2SA$ and CTAB is small, and in particular, if it is 5 or less ($N_2SA - CTAB \leq 5$), the carbon black has a smaller roughness of surface. Carbon black characterized by a difference between $N_2SA$ and IA which is not less than 15 and by a difference between $N_2SA$ and CTAB values which is not more than 5 is capable of reducing the E' of the rubber with which the carbon black is blended. Carbon black having a ΔTint value of −3 or less is effective in decreasing the tan δ of the rubber composition.

While the carbon black to be incorporated in the rubber composition of the present invention must have the properties shown above, there is no particular limitation on the amount of carbon black incorporated in the blend with the polymer. The amount of carbon black used is determined and is dependent on the specific use conditions of a given tire tread. However, the above furnace carbon black having the above properties of the present invention is preferably incorporated in an amount of from 20 to 150 parts by weight in 100 parts by weight of rubber.

The furnace carbon black having the above properties can be prepared, for example, using a conventional oil-furnace type reaction furnace with suitably selecting thermal decomposition conditions of the raw material hydrocarbon, such as, a reaction temperature, an atmosphere in the reaction furnace, a residence time in the reaction furnace until cooling, and the like. In general, in order to increase the difference between the $N_2SA$ value and the IA value, the residence time should be shortened as compared with a conventional furnace carbon black. However, when the residence time is shortened, the difference between the $N_2SA$ value and the CTAB value is increased. Thus, the shortening of the residence time should be suitably selected so as to meet these two differences required in the present invention (i.e., $N_2SA - IA \geq 15$ and $N_2SA - CTAB \leq 5$).

In addition to the carbon black, the rubber composition of the present invention may have incorporated therein other conventional additives such as a vulcanizing agent, a vulcanization accelerator, a vulcanization acceleration aid, an antioxidant, a softening agent, a filler, and the like.

According to the present invention, the combination of the specified polymer and carbon black components provides a rubber composition having an excellent balance between the rolling resistance (RR) and the coefficient (μw) of sliding friction on a wet road surface, while maintaining a sufficient wear resistance. The theory of the mechanism by which the combination of the specified polymer and carbon black components achieves these advantages has not been fully unravelled, but a plausible explanation is as follows.

The carbon black used in the present invention has a very high surface activity as characterized by the great difference between $N_2SA$ and IA values which is 15 or greater than 15. Both the $N_2SA$ and the IA values indicate the specific surface area of the carbon black. The former index is determined by measuring the amount of nitrogen adsorbed on a unit surface area of a carbon black particle. The IA index is determined by measuring the amount of iodine adsorbed on the surface of a unit weight of carbon black particles. In the presence of active sites on the surface of a carbon black particle, iodine is not adsorbed on the particle, so the difference between $N_2SA$ and IA values provides a guide figure for the number of active sites. On the other hand, the rubber component used in the present invention is coupled by tin tetrachloride and has a relatively easily cleavable tin-carbon bond in the molecular chains. This bond is cleaved to form a radical by the shear stress applied to the rubber while it is blended with the carbon black. The thus activated polymer forms a strong bond with an active site on the carbon black surface, thereby providing not a simple mixture of the polymer and carbon black, but a composition having a strong interaction between the two components. This possibly is the reason why the rubber composition of the present invention exhibits an appreciably good balance between its rolling resistance (RR) value and its coefficient (μw) of sliding friction on a wet road surface.

Having generally described this invention, a further understanding can be obtained by reference to certain specific examples which are provided herein for purposes of illustration only and are not intended to be limiting unless otherwise specified. The proportion of the polymer and carbon black components used in the examples, as well as their respective physical properties are shown in the following tables.

TABLE 1-1

| Main Components and Their Properties | (Examples) Formulation No. | | | |
|---|---|---|---|---|
| | 1 | 2 | 3 | 4 |
| Polymer Component No. | A | B | C | D |
| Polymer Component | | | | |
| Styrene content (wt %) | 15 | 10 | 20 | 11 |
| 1,2-Vinyl bond (mol %) | 46 | 50 | 40 | 35 |
| cis 1,4-bond (mol %) | 23 | 21 | 25 | 26 |
| trans 1,4-bond (mol %) | 31 | 29 | 35 | 39 |
| Molecular weight distribution (Mw/Mn) | 1.7 | 2.0 | 1.9 | 1.6 |
| $S_1$* (wt %) | 60 | 42 | 52 | 60 |
| $S_8$** (wt %) | 2.8 | 1.8 | 0.5 | 0.3 |
| Coupling efficiency (%) | 51 | 50 | 49 | 50 |
| Coupling agent | $SnCl_4$ | $SnCl_4$ | $SnCl_4$ | $SnCl_4$ |
| Carbon Black No. | a | a | a | a |
| Carbon Black Component | | | | |
| $N_2SA$ | 82 | 82 | 82 | 82 |
| IA | 65 | 65 | 65 | 65 |
| CTAB | 79 | 79 | 79 | 79 |
| 24M4 DBP (ml/100 g) | 96 | 96 | 96 | 96 |
| Tint | 91 | 91 | 91 | 91 |
| $N_2SA$-IA | 17 | 17 | 17 | 17 |
| $N_2SA$-CTAB | 3 | 3 | 3 | 3 |
| Δ Tint | −6 | −6 | −6 | −6 |
| Physical Property Pico wear (index) | 97 | 98 | 95 | 98 |
| Tire Performance | | | | |
| RR (index) | 82 | 81 | 83 | 80 |
| μw (index) | 105 | 103 | 106 | 98 |
| μw/RR (index) | 1.28 | 1.27 | 1.28 | 1.23 |

TABLE 1-2

| Main Components and Their Properties | (Examples) Formulation No. | | |
|---|---|---|---|
| | 5 | 6 | 7 |
| Polymer Component No. | E | F | G |
| Polymer Component | | | |
| Styrene content (wt %) | 20 | 15 | 10 |
| 1,2-Vinyl bond (mol %) | 49 | 46 | 48 |
| cis 1,4-bond (mol %) | 22 | 22 | 24 |
| trans 1,4-bond (mol %) | 29 | 32 | 32 |
| Molecular weight distribution (Mw/Mn) | 2.5 | 1.7 | 2.8 |
| $S_1$* (wt %) | 48 | 60 | 53 |
| $S_8$** (wt %) | 1.0 | 3.7 | 0.2 |
| Coupling efficiency (%) | 49 | 43 | 50 |
| Coupling agent | $SnCl_4$ | $SnCl_4$ | $SnCl_4$ |
| Carbon Black No. | a | a | a |
| Carbon Black Component | | | |
| $N_2SA$ | 82 | 82 | 82 |
| IA | 65 | 65 | 65 |
| CTAB | 79 | 79 | 79 |
| 24M4 DBP (ml/100 g) | 96 | 96 | 96 |
| Tint | 91 | 91 | 91 |
| $N_2SA$-IA | 17 | 17 | 17 |
| $N_2SA$-CTAB | 3 | 3 | 3 |
| Δ Tint | −6 | −6 | −6 |
| Physical Property | 94 | 96 | 96 |

TABLE 1-2-continued (Examples)

| Main Components and Their Properties | Formulation No. 5 | 6 | 7 |
|---|---|---|---|
| Pico wear (index) | | | |
| Tire Performance | | | |
| RR (index) | 86 | 83 | 82 |
| μw (index) | 107 | 107 | 102 |
| μw/RR (index) | 1.24 | 1.29 | 1.24 |

*$S_1$: Content of the single isolated styrene units which are separated from each other
**$S_8$: Content of the styrene units in the form of long chain blocks each consisting of 8 or more styrene units

TABLE 2-1

(Comparative Examples)

| Main Components and Their Properties | Formulation No. 8 | 9 | 10 | 11 | 12 |
|---|---|---|---|---|---|
| Polymer Component No. | H | I | J | K | L |
| Polymer Component | | | | | |
| Styrene content (wt %) | <30> | 15 | 18 | 17 | 11 |
| 1,2-Vinyl bond (mol %) | 45 | <25> | <60> | 44 | 53 |
| cis 1,4-bond (mol %) | 23 | 32 | 17 | 23 | 18 |
| trans 1,4-bond (mol %) | 32 | 43 | 23 | 33 | 29 |
| Molecular weight distribution (Mw/Mn) | 1.5 | 1.7 | 1.3 | 1.5 | 1.2 |
| $S_1$* (wt %) | 59 | 40 | 63 | <24> | 54 |
| $S_8$** (wt %) | 0.4 | 4.5 | 0.3 | 3.3 | <11.2> |
| Coupling efficiency (%) | 50 | 50 | 51 | 52 | 48 |
| Coupling agent | SnCl₄ | SnCl₄ | SnCl₄ | SnCl₄ | SnCl₄ |
| Carbon Black No. | a | a | a | a | a |
| Carbon Black Component | | | | | |
| N₂SA | 82 | 82 | 82 | 82 | 82 |
| IA | 65 | 65 | 65 | 65 | 65 |
| CTAB | 79 | 79 | 79 | 79 | 79 |
| 24M4 DBP (ml/100 g) | 96 | 96 | 96 | 96 | 96 |
| Tint | 91 | 91 | 91 | 91 | 91 |
| N₂SA-IA | 17 | 17 | 17 | 17 | 17 |
| N₂SA-CTAB | 3 | 3 | 3 | 3 | 3 |
| Δ Tint | −6 | −6 | −6 | −6 | −6 |
| Physical Property Pico wear (index) | 79 | 95 | 75 | 90 | 88 |
| Tire Performance | | | | | |
| RR (index) | 94 | 84 | 86 | 88 | 91 |
| μw (index) | 107 | 96 | 108 | 102 | 103 |
| μw/RR | 1.14 | 1.14 | 1.26 | 1.16 | 1.13 |

TABLE 2-2

(Comparative Examples)

| Main Components and Their Properties | Formulation No. 13 | 14 | 15 | 16 |
|---|---|---|---|---|
| Polymer Component No. | M | N | A | B |
| Polymer Component | | | | |
| Styrene content (wt %) | 15 | 15 | 15 | 10 |
| 1,2-Vinyl bond (mol %) | 46 | 47 | 46 | 50 |
| cis 1,4-bond (mol %) | 23 | 22 | 23 | 21 |
| trans 1,4-bond (mol %) | 31 | 31 | 31 | 29 |
| Molecular weight distribution (Mw/Mn) | 1.5 | 1.7 | 1.7 | 2.0 |
| $S_1$* (wt %) | 60 | 60 | 60 | 42 |
| $S_8$** (wt %) | 2.8 | 2.5 | 2.8 | 1.8 |
| Coupling efficiency (%) | <25> | 50 | 51 | 50 |
| Coupling agent | SnCl₄ | <SiCl₄> | SnCl₄ | SnCl₄ |
| Carbon Black No. | a | a | b N-339 | b N-339 |

TABLE 2-2-continued (Comparative Examples)

| Main Components and Their Properties | Formulation No. 13 | 14 | 15 | 16 |
|---|---|---|---|---|
| Carbon Black Component | | | | |
| N₂SA | 82 | 82 | 93 | 93 |
| IA | 65 | 65 | 91 | 91 |
| CTAB | 79 | 79 | 91 | 91 |
| 24M4 DBP (ml/100 g) | 96 | 96 | 102 | 102 |
| Tint | 91 | 91 | 109 | 109 |
| N₂SA-IA | 17 | 17 | <2> | <2> |
| N₂SA-CTAB | 3 | 3 | 2 | 2 |
| Δ Tint | −6 | −6 | <6> | <6> |
| Physical Property Pico wear (index) | 90 | 95 | 104 | 105 |
| Tire Performance | | | | |
| RR (index) | 92 | 94 | 93 | 92 |
| μw (index) | 105 | 105 | 104 | 103 |
| μw/RR | 1.14 | 1.12 | 1.12 | 1.12 |

*$S_1$: Content of the single isolated styrene units which are separated from each other
**$S_8$: Content of the styrene units in the form of long chain blocks each consisting of 8 or more styrene units Note:
The figures in brackets and the bracketed SiCl₄ coupling agent are outside the scope of the compositional elements defined in the present invention.

Carbon black b is the one which is commonly incorporated in tire treads and is quite different from the carbon black component of the present invention.

TABLE 3

Blends of Polymer A According to the Present Invention and Other Diene Polymers

| Main Components and Their Properties | Example 17 | 18 | Comp. Ex. 19 | Example 20 |
|---|---|---|---|---|
| Polymer Blend (parts by weight) | | | | |
| Polymer component No. A | 70 | 40 | 15 | 70 |
| Natural rubber | 30 | 60 | 90 | — |
| SBR 1502 | — | — | — | 30 |
| Carbon Black No. | a | a | a | a |
| Carbon Black Component | | | | |
| N₂SA | 82 | 82 | 82 | 82 |
| IA | 65 | 65 | 65 | 65 |
| CTAB | 79 | 79 | 79 | 79 |
| 24M4 DBP (ml/100 g) | 96 | 96 | 96 | 96 |
| Tint | 91 | 91 | 91 | 91 |
| N₂SA-IA | 17 | 17 | 17 | 17 |
| N₂SA-CTAB | 3 | 3 | 3 | 3 |
| Δ Tint | −6 | −6 | −6 | −6 |
| Physical Property Pico wear (index) | 104 | 104 | 103 | 106 |
| Tire Performance | | | | |
| RR (index) | 83 | 82 | 82 | 84 |
| μw (index) | 104 | 100 | 92 | 106 |
| μw/RR | 1.25 | 1.22 | 1.12 | 1.26 |

N.B. "Comp. Ex." means Comparative Example.

TABLE 4

Comparative Examples

| Main Components and Their Properties | Formulation No. 21 | 22 | 23 | 24 | 25 |
|---|---|---|---|---|---|
| Polymer Component No. | A | A | A | A | A |
| Carbon Black No. | c | d | e | f | g |
| Carbon Black Component | | | | | |
| N₂SA | 87 | 90 | 100 | 82 | 77 |
| IA | 63 | 70 | 83 | 65 | 55 |
| CTAB | 86 | 87 | 98 | 79 | 77 |
| 24M4 DBP | 105 | 95 | 98 | 96 | 103 |

TABLE 4-continued

Comparative Examples

| Main Components and Their Properties | Formulation No. | | | | |
|---|---|---|---|---|---|
| | 21 | 22 | 23 | 24 | 25 |
| (ml/100 g) | | | | | |
| Tint | 94 | 90 | 103 | 91 | 90 |
| $N_2SA$-IA | 24 | 20 | 17 | 17 | 22 |
| $N_2SA$-CTAB | 1 | 3 | 2 | 3 | 0 |
| Δ Tint | −5 | −12 | −4 | −6 | −4 |
| Physical Property | | | | | |
| tan δ at 60° C. | 0.126 | 0.120 | 0.124 | 0.120 | 0.117 |
| E' (MPa) at 60° C. | 7.00 | 7.05 | 7.26 | 7.00 | 7.11 |
| Pico wear (index) | 100 | 105 | 107 | 97 | 90 |
| Tire Performance | | | | | |
| RR (index) | 84 | 80 | 88 | 81 | 79 |
| μw (index) | 109 | 103 | 111 | 104 | 97 |
| μw/RR | 1.30 | 1.29 | 1.26 | 1.28 | 1.23 |

TABLE 5

Comparative Examples

| Main Components and Their Properties | Formulation No. | | | | | | |
|---|---|---|---|---|---|---|---|
| | 26 | 27 | 28 | 29 | 30 | 31 | 32 |
| Polymer Component No. | A | A | A | A | A | A | A |
| Carbon Black No. | h | i | j | k | l | m | n |
| Carbon Black Component | | | | | | | |
| $N_2SA$ | <70> | <112> | 90 | 90 | 100 | 90 | 82 |
| IA | 55 | 92 | 80 | 75 | 83 | 73 | 65 |
| CTAB | 69 | 106 | 88 | 82 | 99 | 88 | 80 |
| 24M4 DBP (ml/100 g) | 95 | 100 | 100 | 105 | <115> | 97 | 98 |
| Tint | 90 | 95 | 90 | 95 | 100 | <86> | <116> |
| $N_2SA$—IA | 15 | 18 | <10> | 15 | 17 | 17 | 17 |
| $N_2SA$—CTAB | 1 | 4 | 2 | <8> | 1 | 2 | 2 |
| Δ Tint | <−1> | −15 | −11 | <0> | −4 | −16 | <19> |
| Physical Property | | | | | | | |
| tan δ at 60° C. | 0.132 | 0.158 | 0.139 | 0.135 | 0.151 | 0.122 | 0.153 |
| E' (MPa) at 60° C. | 7.74 | 6.63 | 8.11 | 8.21 | 7.53 | 7.00 | 7.84 |
| Pico wear (index) | 75 | 108 | 96 | 99 | 112 | 77 | 110 |
| Tire Performance | | | | | | | |
| RR (index) | 86 | 100 | 87 | 87 | 98 | 81 | 101 |
| μw (index) | 99 | 113 | 98 | 95 | 110 | 102 | 105 |
| μw/RR | 1.15 | 1.13 | 1.10 | 1.07 | 1.12 | 1.26 | 1.04 |

N.B. The figures in brackets are outside the scope defined by the present invention.

TABLE 6

Examples

| Main Components and Their Properties | Formulation No. | | |
|---|---|---|---|
| | 33 | 34 | 35 |
| Polymer Component No. | B | B | B |
| Carbon Black No. | c | d | e |
| Carbon Black Component | | | |
| $N_2SA$ | 87 | 90 | 100 |
| IA | 63 | 70 | 83 |
| CTAB | 86 | 87 | 98 |
| 24M4 DBP (ml/100 g) | 105 | 95 | 98 |
| Tint | 94 | 90 | 103 |
| $N_2SA$-IA | 24 | 20 | 17 |
| $N_2SA$-CTAB | 1 | 3 | 2 |
| Δ Tint | −5 | −12 | −4 |
| Physical Property | | | |
| tan δ at 60° C. | 0.124 | 0.120 | 0.123 |
| E' (MPa) at 60° C. | 6.95 | 6.95 | 7.16 |
| Pico wear (index) | 100 | 106 | 107 |
| Tire Performance | | | |
| RR (index) | 83 | 80 | 88 |
| μw (index) | 109 | 103 | 110 |

TABLE 6-continued

Examples

| Main Components and Their Properties | Formulation No. | | |
|---|---|---|---|
| | 33 | 34 | 35 |
| μw/RR | 1.31 | 1.29 | 1.25 |

TABLE 7

Polymers outside the Scope of the Present Invention

| Main Components and Their Properties | Formulation No. | | | | |
|---|---|---|---|---|---|
| | 36 | 37 | 38 | 39 | 40 |
| Polymer Blend (parts by weight) | | | | | |
| SBR1502 | 100 | 70 | 60 | 100 | 70 |
| BR150B* | — | 30 | — | — | 30 |
| 35% Styrene emulsion polymerized SBR | — | — | 40 | — | — |
| Carbon Black No. | b | b | b | a | a |
| Carbon Black Component | | | | | |
| $N_2SA$ | 93 | 93 | 93 | 82 | 82 |
| IA | 91 | 91 | 91 | 65 | 65 |
| CTAB | 91 | 91 | 91 | 79 | 79 |
| 24M4 DBP (ml/100 g) | 102 | 102 | 102 | 96 | 96 |
| Tint | 109 | 109 | 109 | 91 | 91 |
| $N_2SA$-IA | <2> | <2> | <2> | 17 | 17 |
| $N_2SA$-CTAB | 2 | 2 | 2 | 3 | 3 |
| Δ Tint | <6> | <6> | <6> | −6 | −6 |
| Physical Property | | | | | |
| Pico wear (index) | 100 | 110 | 90 | 95 | 96 |
| Tire Performance | | | | | |
| RR (index) | 100 | 95 | 106 | 94 | 91 |
| μw (index) | 100 | 94 | 107 | 102 | 98 |
| μw/RR | 1.0 | 0.99 | 1.01 | 1.09 | 1.08 |

*BR150B: High cis type BR made by Ube Industries, Ltd.

The physical properties and tire performance indices indicated in the tables were measured for shaped vulcanized products prepared from the polymer and carbon black components shown in the tables which were blended with other components according to the formulation shown below.

| Formulation (in parts by weight) | |
| --- | --- |
| Polymer | 100 |
| Carbon Black | 55 |
| Aromatic Oil | 20 |
| Zinc Oxide | 3 |
| Stearic Acid | 2 |
| Antioxidant [N—phenyl-N'—(1,3-dimethylbutyl)-p-phenylenediamine] | 1.5 |
| Curing Accelerator (N—cyclohexyl-2-benzothiazole sulfenamide) | 1.5 |
| Curing Accelerator (diphenylguanidine) | 0.2 |
| Sulfur | 2 |

The indices given in the respective tables were determined by the following methods. (1) The pico wear value was determined by the standard procedure: ASTM-D 2228 and is expressed as an index, with the value for Formulation No. 36 taken as 100. The smaller the index, the greater the pico wear. (2) For the measurement of rolling resistance (RR) and the coefficient ($\mu$w) of sliding friction on a wet road surface, tire samples (175 SR 14) were prepared using the tread formulations shown in the tables. The respective values of RR and $\mu$w are expressed as indices, with the values for Formulation No. 36 taken as 100. The smaller the value of RR, the better the rolling resistance property. The higher the $\mu$w value, the better the coefficient of sliding friction. The ratio of $\mu$w/RR indicates the balance between RR and $\mu$w, and the greater the ratio, the better the balance between RR and $\mu$w. (3) The parameters tan $\delta$ and E' were measured with a viscoelastic spectrometer (product of Iwamoto Seisakusho, K.K.) under 1% strain and at 100 Hz and 60° C. (4) The specific surface areas of carbon black as measured by the nitrogen adsorption technique ($N_2SA$), iodine adsorption (IA), and the cetyltrimethylammonium bromide adsorption technique (CTAB) are indices for the surface area of a carbon black particle in terms of the nitrogen, iodine or cetyltrimethylammonium bromide adsorbate on the particle. The $N_2SA$ value is indicated in terms of $m^2/g$ and is determined by the method specified in ASTM-D 3037-73. The value of iodine adsorption (IA) is indicated in terms of mg/g and is determined by the method specified in ASTM-D 1765-739. The (CTAB) value is indicated in terms of $m^2/g$ and is determined by the method specified in ASTM-D 3765. The dibutyl phthalate adsorption (24M4 DBP) value and tinting strength (Tint) were measured in accordance with the methods of ASTM-D 3493-79 and ASTM-D 3265-75, respectively.

Table 1 shows the physical properties of Formulation Nos. 1 to 7 using combinations of polymer components (A-G) and carbon black component (a) as defined in the present invention. Table 2 shows the data for Comparative Formulation Nos. 8 to 16. Formulation Nos. 8 to 14 were based on combinations of polymer components not satisfying one or more requirements specified by the present invention, and carbon black component a defined in the present invention. Formulation Nos. 15 and 16 used combinations of polymer components A and B (as defined in the present invention) with carbon black b (ASTM N-339) that is not the carbon black (a) material of the present invention.

Formulation No. 8 having more than 20 wt% of styrene content exhibited low wear resistance and had a small $\mu$w/RR ratio. Small $\mu$w/RR value (poor balance) was also observed with Formulation No. 9 (less than a 35 wt% 1,2-vinyl bond content), with Formulation No. 11 which had less than 40 wt% of the isolated styrene unit content ($S_1$) based on the total styrene, with Formulation No. 12 which had more than 5 wt% of the content of styrene units in long chain block form ($S_8$) based on the total styrene, with Formulation No. 13 which had less than 40% of coupling efficiency, and with Formulation No. 14 which used $SiCl_4$ as a coupling agent.

Formulation No. 10 was based on a styrene-butadiene copolymer wherein the 1,2-vinyl bond content of the butadiene was more than 50 mol%. The resulting tire tread exhibited a high $\mu$w/RR value (good balance), but its wear resistance was very low.

Table 3 shows the results of blending polymer component A of the present invention with other diene polymers. Formulation Nos. 17 and 18 refer to blends with natural rubber; Formulation No. 20 refers to a blend with SBR 1502; and Formulation No. 19 refers to a comparative example wherein only a small amount of polymer component A was blended with natural rubber. This latter formulation had a low $\mu$w/RR value. Therefore, if the polymer component according to the present invention is to be used as a blend with other polymers, the proportion of the former must be at least 30 parts by weight of the blend.

Table 4 shows the superior properties of Formulation Nos. 21 to 25 using combinations of polymer component A of the present invention and carbon black components (c-g) that are within the scope of the carbon black of the present invention.

Table 5 shows the data for comparative samples using combinations of polymer component A of the present invention with carbon black components not satisfying one or more requirements defined in the present invention. Formulation No. 26 exhibiting an $N_2SA$ value of less than 75, and Formulation No. 31 having a Tint value of less than 90 were very low in wear resistance. Formulation Nos. 26, 29 and 32 having $\Delta$ Tint values of more than $-3$ had low $\mu$w/RR values. Formulation No. 27 having $N_2SA$ values of more than 105 had a high RR value that led to a low $\mu$w/RR ratio. Formulation No. 28 ($N_2SA-IA<15$), Formulation No. 29 ($N_2SA-CTAB>5$), Formulation No. 32 (Tint>110) and Formulation No. 30 (24M4 DBP>110) all exhibited low $\mu$w/RR values. Comparison with these formulations shows that the samples that satisfy all of the compositional requirements specified in the present invention exhibit significantly improved properties.

Table 6 shows the data of Formulation Nos. 33 to 35 which used combinations of polymer component B of the present invention and carbon black components c, d and e, also according to the present invention. Like the formulations shown in Table 4, these three samples exhibited superior properties.

Table 7 shows the data of Formulation Nos. 36 to 40 which are outside the scope of the present invention. Formulation Nos. 36 to 38 used combinations of conventional polymer and conventional carbon black components, whereas Formulation Nos. 39 and 40 used combinations of conventional polymer component(s) and carbon black component a that is within the scope defined by the present invention.

The values of tire rolling resistance (RR) and the coefficient ($\mu$w) of sliding friction on a wet road surface indicated in Tables 1 to 7 are correlated in the graph attached to this specification. As is clear from the graph, the values moving further in the direction indicated by the fist represent better results.

In the graph, the samples prepared from the polymer and the carbon black components as defined in the present invention are indicated by solid symbols, whereas comparative formulations are denoted by open symbols. Formulation Nos. 1 to 7 (Table 1) and formulation Nos. 17, 18 and 20 (Table 3) are indicated by solid dots (●), whereas Formulation Nos. 8 to 14 (Table 2) and Formulation No. 19 (Table 3) are indicated by open dots (○). These comparative formulations used polymer components which do not satisfy one or more requirements of the specific styrene-butadiene copolymer of the present invention.

Formulation Nos. 21 to 25 (Table 4) and Nos. 33 to 35 (Table 6) are indicated by solid triangles (▲), whereas Formulation Nos. 26 to 32 (Table 5) are indicated by open triangles (△). These comparative formulations used carbon black components not satisfying one or more requirements of the carbon black material employed in the present invention.

Formulation Nos. 15 and 16 (Table 2—2) and Formulation Nos. 36 to 40 (Table 7) are indicated by open squares (□). Formulation Nos. 15 and 16 used combinations of polymer materials which are embodiments of the styrene-butadiene copolymer of the invention with a conventional carbon black. Formulation Nos. 39 and 40 used combinations of conventional polymer(s) with the carbon black of the present invention. Formulation Nos. 36 to 38 used combinations of conventional polymers with the conventional carbon black.

As far as the graph shows, Formulation Nos. 10 and 31 exhibited $\mu w/RR$ ratio values which are as good as those achieved by the formulations according to the present invention. However, these comparative formulations had a very low wear resistance and were not suitable for use in tread rubber compositions.

As is apparent from the graph, the tire rubber composition of the present invention which uses the combination of the polymer and carbon black components specified in the present specification exhibits a much better balance between the rolling resistance (RR) value and its coefficient ($\mu w$) of sliding friction on a wet road surface than what is achieved when the two components are used individually or when neither one of them is used.

Having now fully described the invention, it will be apparent to one of ordinary skill in the art that many changes and modifications can be made thereto without departing from the spirit or scope of the invention as set forth herein.

What is claimed is:

1. A rubber tire composition, comprising: from 20–150 parts by weight of carbon black incorporated in 100 parts by weight of rubber; said rubber comprising at least 30 parts by weight of a star type solution polymerized, random styrene-butadiene copolymer rubber and no more than 70 parts by weight of at least one other diene rubber, said random styrene-butadiene copolymer rubber comprising 10% to 20% by weight of styrene units and the balance of butadiene units; said styrene units having at least 40% by weight of the single isolated styrene units which are separated from each other and 5% by weight or less of the styrene units in the form of long chain blocks each consisting of 8 or more styrene units bound to each other, based on the entire weight of said styrene units in the copolymer; said butadiene units having 35% to 50% by mole of butadiene units in the form of 1,2-vinyl structure based on the entire mole of said butadiene units in the copolymer; said styrene-butadiene copolymer rubber having the ratio ($\overline{M}w/\overline{M}n$) of 1.2 to 3.5, wherein $\overline{M}w$ and $\overline{M}n$ represent the weight average and number average molecular weights, respectively; and said styrene-butadiene copolymer rubber having a coupling efficiency of 40% or more; and said carbon black being a furnace carbon black having (1) a specific surface area (N₂SA) in the range of 75 to 105 as measured by nitrogen adsorption technique, (2) the difference between said N₂SA value and the measured iodine adsorption value (IA) being at least 15, as represented by the formula $N_2SA - IA \geq 15$, and (3) the difference between said N₂SA value and the measured specific surface area (CTAB) as determined by the cetyltrimethylammonium bromide adsorption technique being not greater than 5, as represented by the formula $N_2SA - CTAB \leq 5$; said furnace carbon black also having a dibutyl phthalate adsorption value (24M4 DBP) of not greater than 110 (ml/100 g) and a tinting strength (Tint) of 90 to 110, provided that the difference (Δ Tint) between the measured Tint and the calculated Tint of the furnace carbon black is not greater than −3, as represented by the formula (measured Tint)−(calculated Tint)$\leq -3$.

2. The composition of claim 1, wherein said star type solution polymerized styrene-butadiene copolymer rubber is coupled with tin tetrachloride.

3. The composition of claim 1, which further comprises at least one additive selected from the group consisting of a vulcanizing agent, a vulcanization acceleration aid, a vulcanization accelerator, an anti-oxidant, a softening agent and a filler.

4. The composition of claim 1, wherein said composition further contains 70 parts by weight or less of other diene rubber.

* * * * *